United States Patent [19]

Shieh

[11] Patent Number: 5,379,618
[45] Date of Patent: Jan. 10, 1995

[54] LOCKING DEVICE ESPECIALLY FOR USE IN LOCKING DISK BRAKE OF MOTOR CYCLE

[76] Inventor: Jin-Ren Shieh, No. 178, Shih Chia Rd., Taichung, Taiwan, Prov. of China

[21] Appl. No.: 53,664

[22] Filed: Apr. 29, 1993

[51] Int. Cl.$^6$ .............................................. E05B 67/36
[52] U.S. Cl. ......................................... 70/33; 70/233; 70/227
[58] Field of Search ............ 70/33, 38 R, 38 A, 38 B, 70/38 C, 53–56, 233, 225–228, 14, 18, 237, 238, 464, 453–455; 188/265, 353; 303/89

[56] References Cited

U.S. PATENT DOCUMENTS

| | | | |
|---|---|---|---|
| 1,473,353 | 11/1923 | Miller | 70/38 C |
| 1,912,663 | 6/1933 | Shinn | 70/33 |
| 1,993,408 | 3/1935 | Ledin | 70/38 B |
| 2,104,981 | 1/1938 | Falk | 70/33 |
| 2,460,615 | 2/1949 | Andrew | 70/386 |
| 2,656,704 | 10/1953 | Mancuso | 70/33 X |
| 4,030,321 | 6/1977 | Kenyon | 70/34 |
| 4,183,235 | 1/1980 | Coralli et al. | 70/34 |
| 4,359,886 | 11/1982 | Evans et al. | 70/464 X |
| 4,545,224 | 10/1985 | Zane | 70/55 X |
| 5,127,244 | 7/1992 | Myers | 70/34 X |
| 5,247,815 | 9/1993 | Caldwell | 70/19 |
| 5,265,451 | 11/1993 | Phifer | 70/226 |

FOREIGN PATENT DOCUMENTS

| | | | |
|---|---|---|---|
| 949650 | 9/1949 | France | 70/33 |
| 439631 | 5/1925 | Germany | 70/33 |
| 1808343 | 8/1969 | Germany | 70/33 |

Primary Examiner—Peter M. Cuomo
Assistant Examiner—Suzanne L. Dino
Attorney, Agent, or Firm—Browdy and Neimark

[57] ABSTRACT

A locking device of a motor cycle disk brake has a body provided with a slot perpendicular to one of the sides of the body. A locking bolt is disposed in the body such that the locking bolt can be caused to move between a first position and a second position. When the locking bolt is located at the second position, the locking bolt seals off an end of the slot. A locking apparatus is housed in the body and is composed of a lock core capable of being caused to locate at a third position or at a fourth position at such time when the locking apparatus is in an unlocking state or in a locking state. The lock core is coupled with the locking bolt in such a manner that the axes of the lock core and the locking bolt are parallel to each other. The locking bolt and the lock core can be caused to act synchronously. When the locking bolt is caused to seal off the slot, the locking bolt is simultaneously aligned to pass through one of the heat-radiating holes of the disk brake, thereby incapacitating the motor cycle.

9 Claims, 5 Drawing Sheets

LOCKING DEVICE ESPECIALLY FOR USE IN LOCKING DISK BRAKE OF MOTOR CYCLE

FIELD OF THE INVENTION

The present invention relates to a locking device, and more particularly to a locking device for use in locking a motor cycle disk brake having heat-radiating holes, so as to disable the motor cycle.

BACKGROUND OF THE INVENTION

The conventional method of incapacitating a motor cycle is to use a U-shaped lock, which is put through the wheel frame so as to prevent the theft or the unauthorized use of the motor cycle. The use of such U-shaped lock to disable a motor cycle is inconvenient and troublesome, in view of the fact that the position of the wheel to be locked must be first adjusted properly to allow the U-shaped lock to be put through the wheel frame, and that the U-shaped lock is too bulky to be carried on a motor cycle, which is provided with little or no space for holding the U-shaped lock.

SUMMARY OF THE INVENTION

It is therefore the primary objective of the present invention to provide a locking device capable of cooperating with any one of the heat-radiating holes of a motor cycle disk brake so as to bring about a disabling effect on the motor cycle.

It is another objective of the present invention to provide an improved locking device which can be used to incapacitate a motor cycle easily and conveniently.

It is still another objective of the present invention to provide an improved locking device so compact as to be carried easily and conveniently on a motor cycle.

The foregoing objectives of the present invention are attained by a locking device, which comprises a body, a locking bolt, and a locking apparatus. The body has a first side, a second side adjacent to the first side, and a slot of a predetermined length and substantially perpendicular to the first side of the body. The locking bolt is disposed in the body such that the locking bolt can be moved between a first position and a second position. In the absence of an external force, the locking bolt remains at the first position. In the presence of an external force, the locking bolt is forced to move from the first position to the second position so as to seal the Open end of the slot. The locking bolt has an outer diameter so dimensioned as to permit the locking bolt to be put through the heat-radiating holes of the disk brake of a motor cycle. The slot has a length sufficient to accommodate the disk brake so that the locking bolt can be put through one of the heat-radiating holes of the disk brake. The locking apparatus is housed in the body and is composed of a lock core capable of moving between a third position and a fourth position in conjunction with the unlocking and the locking of the locking apparatus. When the lock core is located at the third position, the locking bolt is situated at the first position. As the lock core moves from the third position to the fourth position, the locking bolt moves synchronously from the first position to the second position. The locking device of the present invention is characterized in that the axis of the locking bolt is parallel to the first side of the body, and that the lock core is coupled with the locking bolt in such a manner that the axis of the lock core and the axis of the locking bolt are parallel to each other. As a result, the locking bolt can be moved synchronously with the lock core to be put through the heat-radiating hole of the disk brake, thereby bringing about a disabling effect on the motor cycle.

A first preferred embodiment of the present invention comprises a body divided by a slot into a first portion and a second portion, with the first portion being wider than the second portion. The first portion is provided with an axis parallel to the first side and the hole to be put through while the second portion is furnished with an open end adjacent to the slot and the locking hole situated on the axis of the tunnel. The locking bolt is received in the front segment of the tunnel. When the locking bolt is located at the second position, one end of the locking bolt extends outwards to traverse the slot to enter the locking hole. The locking apparatus is received in the rear segment of the tunnel so as to cause the lock core to move along the direction of the axis of the tunnel between the third position and the fourth position.

A second preferred embodiment of the present invention comprises a locking apparatus having a cylindrical body which is disposed in the rear segment of the tunnel. The lock core is disposed in the cylindrical body such that the lock core moves in a linear manner between the third and the fourth positions. The length of the lock core is greater than that of the cylindrical body. When the lock core is situated at the third position, one end of the lock core extends outwards via one end of the hole while another end of the lock core is in contact with the locking bolt. In addition, the locking bolt has a bolt body and a base having a greater diameter. A first shoulder is formed at the tunnel and the end adjacent to the slot and is of an inner diameter smaller than the inner diameter of the front segment of the tunnel. The bolt body is fitted into a first spring in such a manner that one end of the first spring presses against the first shoulder and that another end of the first spring presses against the base. As a result, when the lock core is located at the third position, the locking bolt remains at the first position by virtue of the elastic force of the first spring exerting on the locking bolt. When the lock core is caused to move from the third position to the fourth position, the locking bolt is caused to move synchronously from the first position to the second position so as to bring about a locking effect on the disk brake.

A third preferred embodiment of the present invention comprises a sleeve fitting over the locking apparatus. The sleeve is disposed in the rear segment of the hole such that the locking apparatus can be caused to move between the third and the fourth positions. The locking bolt is coupled with the lock core in such a manner that the locking bolt can be rotated along with the lock core. A braking member is disposed in the front segment of the tunnel such that the braking member can be moved between a releasing position and a braking position. When the locking bolt is caused to move from the first position to the second position, the braking member is to move from the releasing position to the braking position so as to keep the locking bolt to remain at the second position, thereby bringing about a locking effect on the disk brake. When the lock core is rotated by a key to remain in an unlocking state, the braking member is then caused to move from the braking position to the releasing position, thereby resulting in the movement of the locking bolt from the second position to the first position.

It must be noted here that the locking bolt may be coupled with the lock core in such a manner that the locking bolt can be caused to move linearly only along with the locking apparatus. In addition, the braking member may be disposed in the tunnel of the body such that the braking member can be caused to move between the releasing position and the braking position only in conjunction with the rotating motion of the lock core.

DETAILED DESCRIPTION OF THE INVENTION

Figure 1:
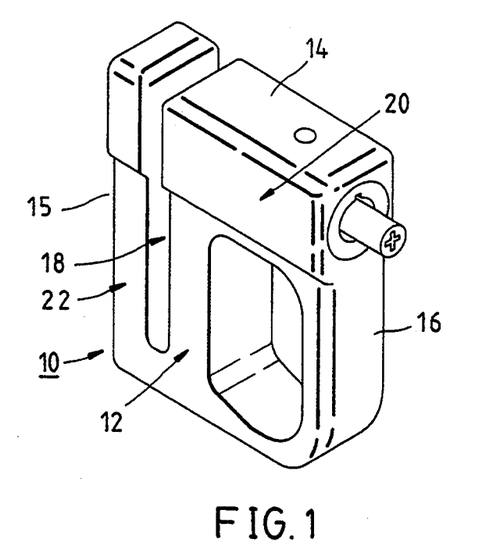
FIG. 1 shows a perspective view of the first preferred embodiment of the present invention.
Figure 2:
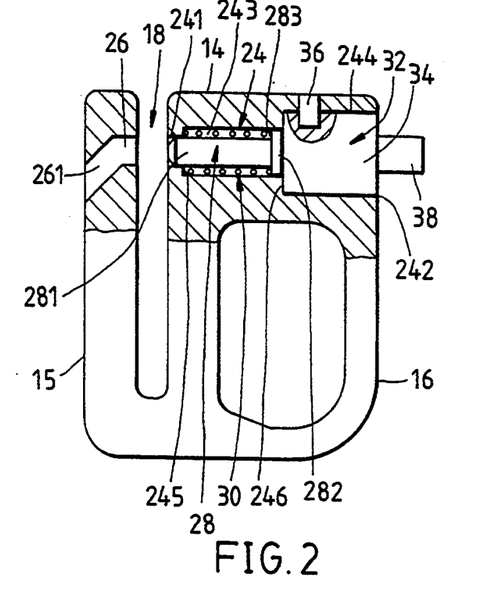
FIG. 2 is a sectional view of a portion taken along the line 2—2 as shown in FIG. 1, showing that the locking bolt is located at the first position.
Figure 3:
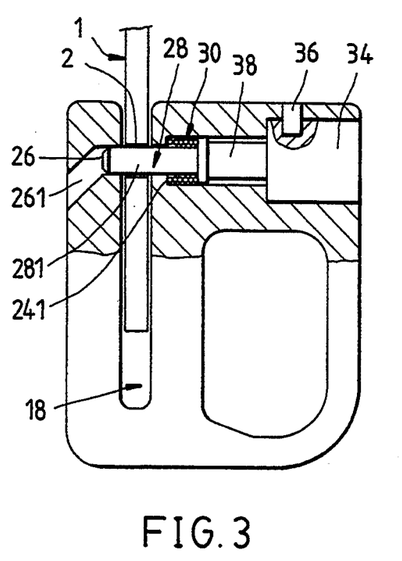
FIG. 3 is a sectional view of a portion taken along the line 2—2 as shown in FIG. 1, showing that the locking bolt is located at the second position.

Referring to FIGS. 1-3, a locking device 10 of the first preferred embodiment of the present invention is shown to comprise a body 12 provided with a first side 14, a second side 15 adjacent to one end of the first side 14, a third side 16 adjacent to another end of the first side 14 and parallel to the second side 15, and a slot 18 of a predetermined length and perpendicular to the first side 14. The body 12 is divided by the slot 18 into a first portion 20 and a second portion 22 having a width smaller than that of the first portion 20. The first portion 20 has an axis and a tunnel 24 parallel to the first side 14 and passing through the third side 16. The second portion 22 has an opening end and a locking hole 26 which is adjacent to the slot 18 and is located on the extension line of the axis of the tunnel 24. The tunnel 24 has an inner opening 241 adjacent to the slot 18, an outer opening 242 located in the third side 16 of the body 12 and having a diameter greater than that of the inner opening 241, a front segment 243 adjacent to the inner opening 241, and a rear segment 244 located between the front segment 243 and the outer opening 242. The front segment 243 has a diameter that is slightly greater than that of the inner opening 241. A first shoulder 245 is located at the junction between the front segment 243 and the inner opening 241. The rear segment 244 has a diameter corresponding to that of the outer opening 242. Located at the junction between the front and the rear segments 242 and 244 is a second shoulder 246.

The locking bolt 28 is disposed in the front segment 243 and is composed of a bolt body 281 having an outer diameter slightly smaller than that of the inner opening 241, a base 282 having an outer diameter greater than that of the bolt body 281, and a first spring 30 which is fitted over the bolt body 281 in such a manner that one end of the second spring 30 urges the first shoulder 24, and that another end of the second spring 30 urges the upper edge surface 283 of the base 282. In the absence of an external force, the locking bolt 28 is forced by the first spring 30 to remain at the first position, as shown in FIG. 2. In the presence of an external force exerting on the locking bolt 28, the locking bolt 28 is caused to move to the second position, as shown in FIG. 3, thereby causing the bolt body 281 to extend outwards via the inner opening 241 to traverse the slot 18 so as to enter the locking hole 26.

The locking apparatus 32 has a cylindrical body 34 fastened to the rear segment 244 by means of a fastening bolt 36, and a lock core 38 Which is disposed in the cylindrical body 34 in such a manner that the lock core 38 is capable of moving axially between a third position and a fourth position. When the locking apparatus 32 is unlocked, the lock core 38 is located at the third position, as shown in FIG. 2, with one end of the lock core 38 extending outwards via the outer opening 242 and with another end of the lock core 38 making contact with the base 282. Under such a circumstance, the lock core 38 can be caused to move to the fourth position, as shown in FIG. 3. In the meantime, the locking bolt 28 is urged by the lock core 38 so as to move from the first position to the second position where the locking bolt 28 seals off the slot 18, thereby placing the locking apparatus 32 in a locked state under which the locking bolt 28 is confined to the second position.

In using the locking device 10 of the present invention, a motor cyclist must first insert the disk brake 1 into the slot 18 and make sure that one of the heat-radiating holes 2 is aligned with the locking bolt 28. Thereafter, the lock core 38 is pressed to move from the third position to the fourth position. As a result, the locking bolt 28, which is located at the first position, extends outwards via the inner opening 241 to pass through the heat-radiating hole 2, thereby causing the bolt body 281 to enter the locking hole 26, as shown in FIG. 3. The disk brake 1 of the motor cycle is therefore disabled by the locking device 10 of the present invention. With a view to facilitating the removal of the dust deposited in the locking hole 26, the second portion 22 is provided with a slanted through hole 261 in communication with the locking hole 26. Therefore, the dust deposited in the locking hole 26 can be successfully forced out via the slanted through hole 261 at such time when the locking bolt 28 is inserted into the locking hole 26.

Figure 4:
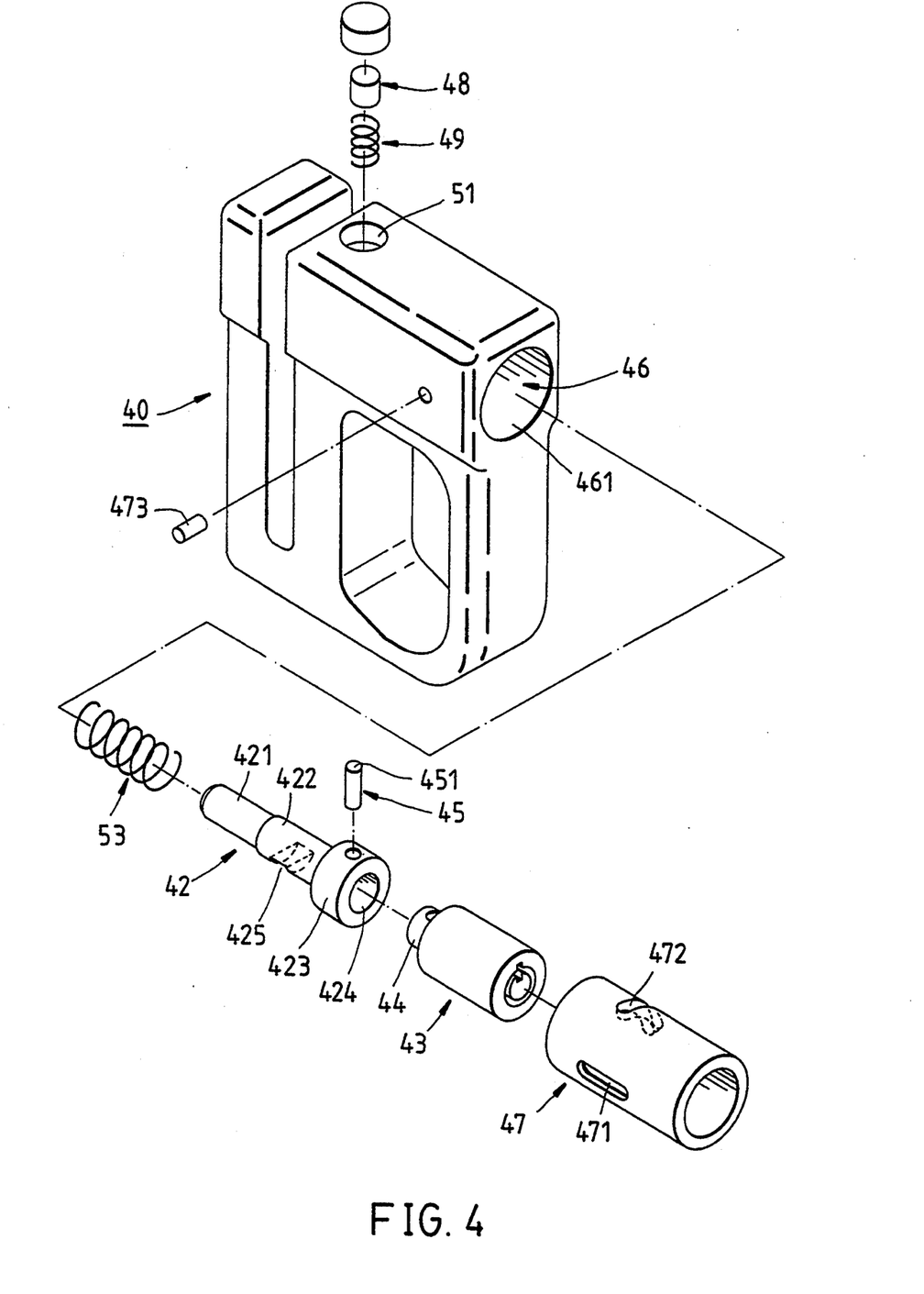
FIG. 4 shows an exploded view of the second preferred embodiment of the present invention.
Figure 5:
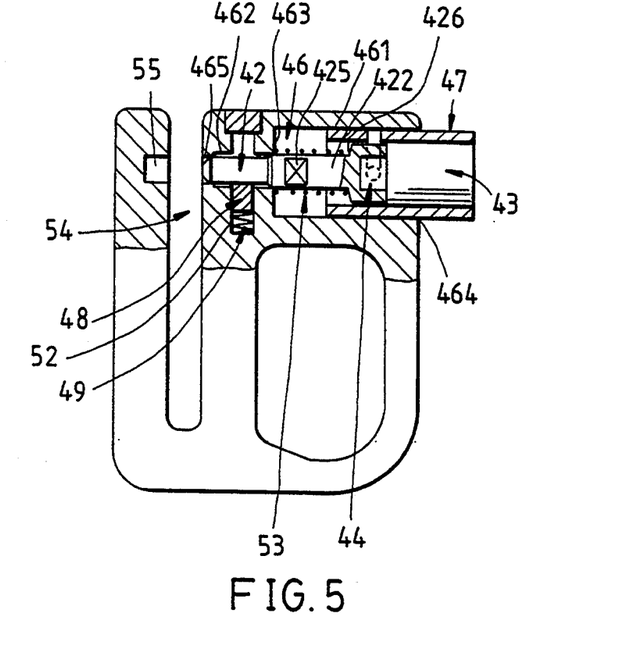
FIG. 5 is a sectional view of the second preferred embodiment taken along the same direction as that of FIG. 2, showing that the locking bolt is located at the first position.
Figure 6:
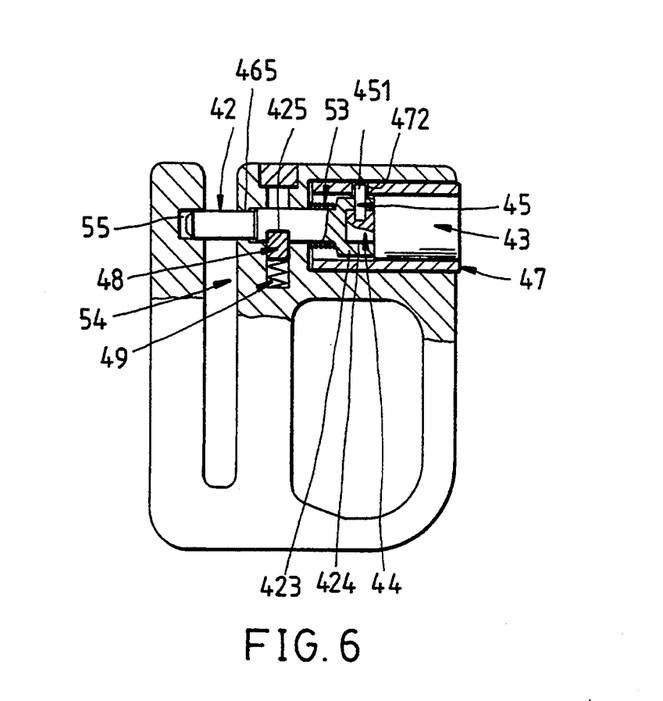
FIG. 6 is a sectional view of the second preferred embodiment taken along the same direction as that of FIG. 2, showing that the locking bolt is located at the second position.

Now referring to FIGS. 4-6, a locking device 40 of the second preferred embodiment of the present invention is shown to comprise a locking bolt 42, which has a first bolt body 421 having a progressively enlarged outer diameter, a second bolt body 422, and a base 423. The base 423 is provided with a depression 424 to receive therein a lock core 44 of a locking apparatus 43. The base 423 and the locking apparatus 43 are then fastened together by means of a locating pin 45 which is disposed at a position perpendicular to the axes of the base 423 and the locking apparatus 43. The locating pin 45 has an outer end 451. A sleeve 47 of a dimension is used to fit over the locking apparatus 43 and the rear segment of the locking bolt 42. The sleeve 47 is received in the rear segment 461 of the tunnel 46 and is provided in the outer surface thereof with a sliding slot 471. Located oppositely to the rear segment 461 is a locating pin 473 capable of being inserted into the sliding slot 471. As a result, the sleeve 47 can be caused to move axially along with the locking apparatus 43 between a third position and a fourth position. Located in the outer wall of the sleeve 47 is an angle limiting slot 472 corresponding in location to the locating pin 45 for receiving the outer end 451 of the locating pin 45. Therefore, the lock core 44 is rotatably confined within the arcuate range of the angle limiting slot 472.

The locking device 40 is further provided with a braking pin 48 and a compression spring 49, which are disposed in the slot 52 of the front segment 462 of the tunnel 46 via a through hole 51 of the body 50. The second bolt body 422 of the locking bolt 42 is provided with a horizontally oriented tangent slot 425 in which the braking pin 48 is received at such time when the locking bolt 42 is located at the second position, as shown in FIG. 6. As a result, the braking pin 48 brings about a braking effect on the locking bolt 42. When the locking bolt 42 is caused to turn for a predetermined angle, the braking pin 48 is then caused to move out of the tangent slot 425 so that the locking bolt 42 is kept at the first position by virtue of the elastic force of a second spring 53, which is fitted over the second bolt body 422 in such a manner that one end of the second spring 53 urges a shoulder 463 and that another end of the second spring 53 urges an upper edge 426 of the base 423. In view of the fact that the lock core 44 of the locking apparatus 43 is fastened with the locking bolt 42 and that the locking apparatus 43 is united with the sleeve 47, the sleeve 47 is capable of carrying the locking apparatus 43 to locate at the third position, as shown in FIG. 5, when the locking bolt 42 is forced to remain at the first position by the second spring 53. As shown in FIG. 5, the sleeve 47 and the locking apparatus 43 are seen to extend outwards via the outer opening 464 of the tunnel 46 when the sleeve 47 and the locking apparatus 43 are located at the third position.

In addition, the lock core 44 of the locking apparatus 43 of the locking device 40 is so designed as to be rotated by a key for a predetermined angle. The key can be removed from the lock core 44 only after the lock core 44 is rotated back to its original position. When the locking device 40 is unlocked, the locking bolt 42 and the locking apparatus 43 are located respectively at the first position and the third position. In addition, the tangent slot 425 of the locking bolt 42 faces the braking pin 48. As a result, the locking bolt 42 can be caused to move from the first position to the second position by pressing inwards and simultaneously the locking apparatus 43 and the sleeve 47 to move to the fourth position. In the meantime, the front end of the first bolt body 421 extends outwards via the inner opening 465 to enter the locking hole 55 after having passed through a heat-radiating hole of the disk brake which is received in the slot 54. The locking bolt 42 is confined at the second position by the braking pin 48 which is so urged by the compression spring 49 as to move into the tangent slot 425. As a result, the locking device 40 is locked, as shown in FIG. 6. Of course, the locking device 40 so locked can be unlocked by using the key to rotate the lock core 44 to cause the outer end 451 of the locating pin 45 to reach one end of the angle limiting slot 472, so as to cause the braking pin 48 to move out of the tangent slot 425 of the locking bolt 42. As a result, the locking bolt 42 is urged by the second spring 53 to move from the second position to the first position. In the meantime, the locking apparatus 43 and the sleeve 47 are caused to move back to the third position from the fourth position, as shown in FIG. 5. The locking device 40 is therefore unlocked and can be readily removed from the disk brake, to which it was attached securely, by turning the key in reverse to cause the outer end 451 of the locating pin 45 to reach another end of the angle limiting slot 472.

Figure 7:
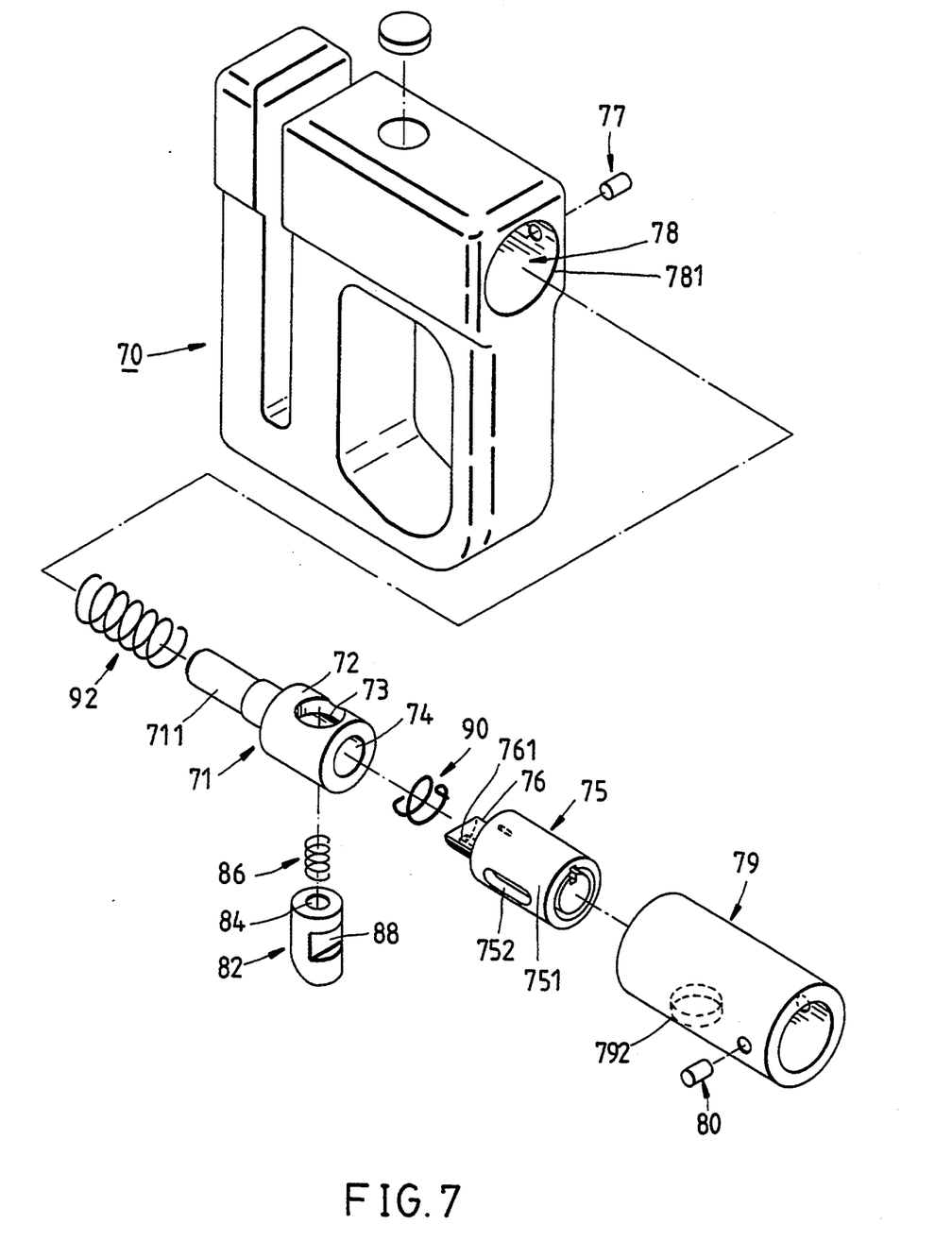
FIG. 7 shows an exploded view of the third preferred embodiment of the present invention.
Figure 8:
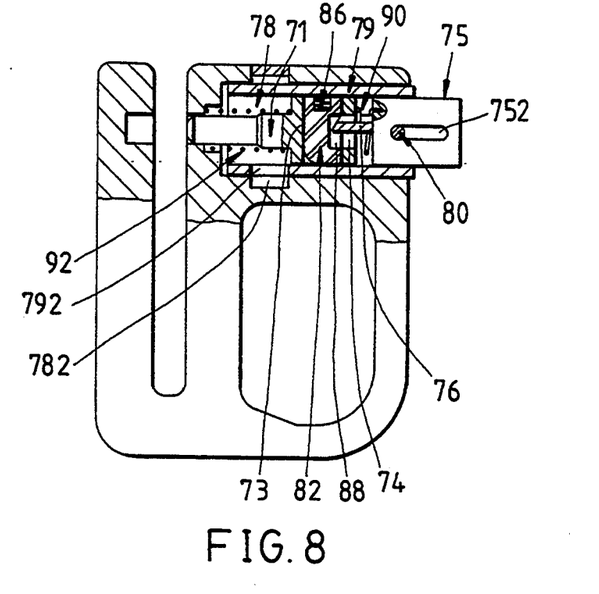
FIG. 8 is a sectional view of the third preferred embodiment taken along the same direction as that of FIG. 2, showing that the locking bolt is located at the first position.
Figure 9:
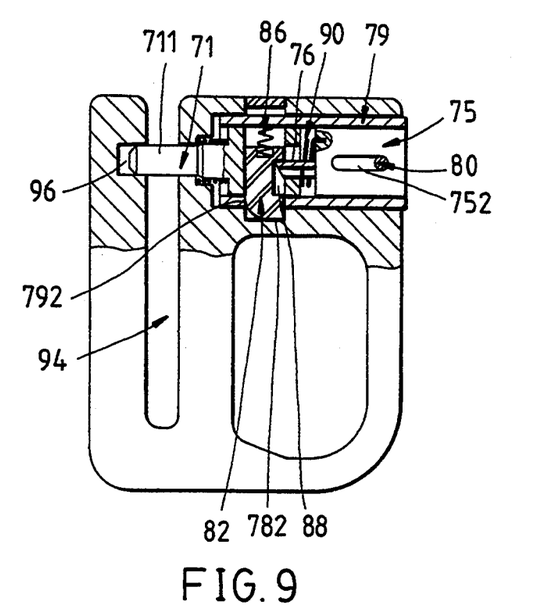
FIG. 9 is a sectional view of the third preferred embodiment taken along the same direction as that of FIG. 2, showing that the locking bolt is located at the second position.

The third preferred embodiment of the present invention is illustrated in FIGS. 7-9, in which a locking device 70 is shown comprising a locking bolt 71 having a base 72 which is provided with a vertical through hole 73 and a duct 74 in communication with the vertical through hole 73. The locking apparatus 75 has a lock core 76 which is semicircular in its cross section and can be inserted into the duct 74. Both locking bolt 71 and the locking apparatus 75 are disposed securely in a sleeve 79 which is fastened securely to the rear segment 781 of a tunnel 78 by means of a fastening pin 77. Both locking bolt 71 and the locking apparatus 75 can be caused to move axially. The locking apparatus 45 has a cylindrical body 751 provided with a sliding slot 752 parallel to the axis of the cylindrical body 751. The moving range of the locking apparatus 75 is restrained by a locating pin 80 which passes through the rear segment 781 and the sleeve 79 to enter the sliding slot 752. Received in the vertical through hole 73 is a braking pin 82 which has in its top end a blind hole 84 in which a compression spring 86 is arranged such that one end of the compression spring 86 urges the inner wall of the sleeve 79. The braking pin 82 is further provided with a longitudinally oriented tangent slot 88, which is corresponding in location to the duct 74 and which has a length slightly greater than the diameter of the front end of the lock core 76. The tangent slot 88 is to receive therein the front end of the lock core 76. The rear segment 781 is provided with a recess 782 opposite in location to a through hole 792 of the sleeve 79. When the locking pin 71 is caused to move to the vertical through hole 73 to be in alignment with the recess 782 and the through hole 792, the braking pin 82 is caused by the compression spring 86 to move into the recess 782 via the through hole 792 so as to confine the locking pin 77.

The third preferred embodiment of the present invention employs a torsion spring 90, which is fitted over the lock core 76 such that one end of the torsion spring 90 is retained in a groove 761 of the lock core 76 and that another end of the torsion spring 90 is fastened to the cylindrical body 751. As a result, when the lock core 76 is not rotated by a key, the lock core 76 is received in the tangent slot 88 of the braking pin 82 in such a manner that the arcuate surface of the lock core 76 faces downwards. As soon as the lock core 76 has been rotated by the key for an angle of 90 degrees, the arcuate surface of the lock core 76 is received in the tangent slot 88 in such a manner that the longitudinal axis of the lock core 76 is parallel to the longitudinal axis of the tangent slot 88. As a result, the braking pin 82 is pushed upwards so as to move out of the recess 782.

As shown in FIG. 8, when the locking device 70 is in an unlocked state, the locking bolt 71 and the locking apparatus 75 are urged by a third spring 92 to remain respectively at the first position and the third position.

The third spring 92 is fitted over the locking bolt 71. The braking pin 82 is no longer received in the recess 782 while the lock core 76 is caused to move into the tangent slot 88 of the braking pin 82 in such a manner that the arcuate surface of the semicircular portion of the lock core 76 faces downwards. The locking apparatus 70 can be locked by pressing inwards the locking apparatus 70 to cause the locating pin 80 to reach one end of the sliding slot 752, thereby causing the locking apparatus 75 and the locking bolt 71 to move respectively from the first and the third positions to the second and the fourth positions, as shown in FIG. 9. The bolt body 711 of the locking bolt 71 is therefore caused to pass through the slot 94 to enter the locking hole 96 while the braking pin 82 is caused, along with the locking bolt 71, to move to be in alignment with the through hole 792 so as to enter the recess 782. As a result, the locking bolt 71 is confined to the second position so as to bring about a locking effect on the locking device 70, which can be then unlocked by means of a key which is used to rotate the lock core 76 until such time when the longitudinal axis of the lock core 76 is parallel to the longitudinal axis of the tangent slot 88 so as to permit the braking pin 82 to be lifted to move out of the recess 782. In the meantime, the locking bolt 71 and the locking apparatus 75 are urged by the third spring 92 to move respectively from the second and the fourth positions to the first and the third positions. Therefore, the locking device 70 can be removed from the disk brake to which the locking device 70 was attached. In the meantime, the arcuate surface of the semicircular portion of the lock core 76 faces downwards so that the locking device 70 is ready to be used again to incapacitate the motor cycle.

What is claimed is:

1. A locking device especially for use in locking disk brake of motor cycle comprising:

a body having a first side, a second side adjacent to said first side, and a slot of a length and substantially perpendicular to said first side;

said body being divided by the slot into a first portion and a second portion having a width smaller than said first portion, said first portion having a tunnel parallel to said first side;

a locking bolt disposed in said body such that said locking bolt can be caused by an external force to move from a first position to a second position so as to seal off an opening end of said slot of said body, said locking bolt having an outer diameter so dimensioned as to permit said locking bolt to pass through one of heat-radiating holes of a disk brake of a motor cycle, said length of said slot being sufficient to receive said disk brake;

said locking bolt being disposed in a front segment of said tunnel, a locking apparatus being fastened in a rear segment of said tunnel;

a locking apparatus housed in said body and provided with a lock core capable of remaining at a third position or a fourth position at such time when said locking apparatus is in an unlocking state or in a locking state, said lock core being at said third position at such time when said locking bolt is caused to move to remain at said first position, and further said lock core being at said fourth position at such time when said locking bolt is caused to move to remain at said second position;

wherein said locking bolt is so disposed that the axis of said locking bolt is parallel to said first side; and wherein said lock core is coupled with said locking bolt in such a manner that the axes of said lock core and said locking bolt are parallel to each other, wherein said second portion is provided with a slanted through hole in communication with a locking hole;

wherein dust deposited in said locking hole is forced out through said slanted through hole when said locking bolt is inserted into said locking hole.

2. The locking device according to claim 1 wherein said second portion has a locking hole with an opening end which is adjacent to said slot and is located on an extension line of said axis of said tunnel; wherein said locking bolt is received in said tunnel such that one end of said locking bolt extends outwards from said tunnel to traverse said slot to enter said locking hole at such time when said locking bolt is caused to be located at said second position; and wherein said locking apparatus is disposed in a rear segment of said tunnel such that said locking apparatus can be caused to move out of a rear opening of said rear segment of said tunnel at such time when said locking apparatus is located at said fourth position.

3. The locking device according to claim 2 wherein said tunnel has a front segment with a diameter greater than a diameter of a front opening of said tunnel; wherein said rear segment of said tunnel has a diameter greater than said diameter of said front segment; wherein said rear opening of said rear segment has a diameter corresponding in dimension to said diameter of said rear segment, said front segment and said front opening forming therebetween a first shoulder, said rear segment and said front segment forming therebetween a second shoulder; and wherein said locking bolt is disposed in said front segment while said locking apparatus is disposed in said rear segment.

4. The locking device according to claim 3 wherein said locking bolt has a bolt body with an outer diameter smaller than said diameter of said front opening of said tunnel, a base adjacent to an end of said bolt body and having an outer diameter greater than said diameter of said front opening and smaller than said diameter of said rear segment, and a first spring fitting over said bolt body in such a manner that both ends of said first spring urge respectively said first shoulder and a top surface of said base.

5. The locking device according to claim 4 wherein said locking apparatus has a cylindrical body fastened to said rear segment; and wherein said lock core is disposed in said cylindrical body such that said lock core can be caused to move axially between said third position and said fourth position, with one end of said lock core moving outwards via said rear opening so as to cause said lock core to locate at said third position at such time when said locking apparatus remains in an unlocking state, said locking apparatus capable of being in a locking state by virtue of said lock core which can be pressed inwards to locate at said fourth position, thereby causing said locking bolt to move from said first position to said second position.

6. The locking device according to claim 4 further comprising a sleeve fitting over said locking apparatus and said rear segment of said tunnel in such a manner that said sleeve can be moved axially and back and forth within a range, said lock core being disposed in said locking apparatus such that said lock core can be caused to rotate for a predetermined angle at such time when said lock core is in an unlocking state, said locking device further comprising a braking member disposed in said front segment of said tunnel such that said braking member can be caused to move between a releasing position and a braking position, said braking member being at said releasing position to cause said locking bolt, said locking apparatus and said sleeve to move out of one end of said tunnel so as to locate respectively at said first position and said third position at such time when said lock core is rotated for a predetermined angle, said braking member being caused to move from said releasing position to said braking position by said lock core, which is rotated back to an original position thereof, so as to cause said locking bolt and said lock core to be confined respectively at said second position and said fourth position at such time when said locking apparatus is in a locking state.

7. The locking device according to claim 6 wherein said base is provided with a recess into which an open end of said lock core is inserted, and with a locating pin disposed in said recess and said open end of said lock core such that said locating pin is perpendicular to the axes of said base and said lock core, said locating pin having an outer end; wherein said sleeve has a wall provided with an angle limiting slot corresponding in location to said locating pin for receiving therein said outer end of said locating pin, said angle limiting slot having a length within which said lock core is caused to rotate; wherein said braking member has a first compression spring and a braking pin, which are disposed in a depression of said front segment of said tunnel; and wherein said bolt body of said locking bolt is provided with a tangent slot corresponding in location to said depression, said braking pin being urged by said compression spring to enter said tangent slot at such time when said locking bolt is located at said second position.

8. The locking device according to claim 6 wherein said base is fitted into said sleeve and is provided with a hole perpendicular to the axis of said base, and with a through hole in communication with said hole; wherein said braking pin is provided at the top surface thereof with a blind hole in which a second compression spring is received in such a manner that one end of said compression spring urges an inner wall of said sleeve; wherein said rear segment of said tunnel is provided with a recess corresponding in location to a through hole of said sleeve; wherein said braking pin is urged by said second compression spring to enter said recess via said through hole so as to confine said locking bolt at said second position; wherein said braking pin is provided with a longitudinal tangent slot having a length longer than a length of said open end of said lock core, so as to permit said braking pin to be lifted to move out of said recess at such time when said lock core is rotated to an extent that the lengthwise direction of said lock core is parallel to the lengthwise direction of said longitudinal tangent slot.

9. The locking device according to claim 8 further comprising a torsion spring fitted over said open end of said lock core in such a manner that one end of said torsion spring is fastened to an outer wall of said locking apparatus, and that another end of said torsion spring is fastened to said open end of said lock core.

* * * * *